(12) United States Patent
Szirtes et al.

(10) Patent No.: US 10,540,678 B2
(45) Date of Patent: Jan. 21, 2020

(54) DATA PROCESSING METHODS FOR PREDICTIONS OF MEDIA CONTENT PERFORMANCE

(71) Applicant: REALEYES OÜ, Tallinn Harju (EE)

(72) Inventors: Gábor Szirtes, Tallinn (EE); Javier Orozco, Tallinn (EE); István Petrás, Tallinn (EE); Dániel Szolgay, Tallinn (EE); Ákos Utasi, Tallinn (EE); Jeffrey Cohn, Pittsburgh, PA (US)

(73) Assignee: REALEYES OÜ, Tallinn Harju (EE)

( * ) Notice: Subject to any disclaimer, the term of this patent is extended or adjusted under 35 U.S.C. 154(b) by 127 days.

(21) Appl. No.: 15/653,051

(22) Filed: Jul. 18, 2017

(65) Prior Publication Data

US 2018/0158093 A1 Jun. 7, 2018

(30) Foreign Application Priority Data

Dec. 2, 2016 (GB) .................. 1620476.0

(51) Int. Cl.
*G06Q 30/02* (2012.01)
*G06N 5/02* (2006.01)
*G06F 16/48* (2019.01)

(52) U.S. Cl.
CPC ....... *G06Q 30/0242* (2013.01); *G06F 16/489* (2019.01); *G06N 5/022* (2013.01)

(58) Field of Classification Search
CPC .......... G06Q 30/0277; G06Q 30/0242; H04N 21/252; G06F 16/489; G06N 5/022
See application file for complete search history.

(56) References Cited

U.S. PATENT DOCUMENTS

2008/0295126 A1* 11/2008 Lee .................. G06Q 30/02
725/10
2009/0265170 A1* 10/2009 Irie .................. G10L 17/26
704/236

(Continued)

FOREIGN PATENT DOCUMENTS

WO WO 2016/034565 A1 3/2016

OTHER PUBLICATIONS

K. Schaaff and T. Schultz, "Towards emotion recognition from electroencephalographic signals," 2009 3rd International Conference on Affective Computing and Intelligent Interaction and Workshops, Amsterdam, 2009, pp. 1-6.*

(Continued)

*Primary Examiner* — Luis A Brown
*Assistant Examiner* — Robert C Johnson
(74) *Attorney, Agent, or Firm* — Leason Ellis LLP

(57) ABSTRACT

Methods and systems of predicting performance data for a piece of media content that is consumable by a user at a client device are provided. In one or more embodiments, the method collects raw input data, such as from a webcam, indicative of a user's response to the media content as the user watches the content. The data is processed to extract and obtain a series of head pose signals and facial expression signals, which is then input to a classification model. The model maps the performance data of the media content over time in response to the signals evaluated by the method to produce a prediction of the performance of the piece of media content.

19 Claims, 6 Drawing Sheets

(56) References Cited

U.S. PATENT DOCUMENTS

| | | | |
|---|---|---|---|
| 2014/0323817 A1* | 10/2014 | el Kaliouby | A61B 5/165 600/300 |
| 2016/0170996 A1* | 6/2016 | Frank | G06F 17/30702 707/748 |
| 2016/0191995 A1 | 6/2016 | El Kaliouby et al. | |

OTHER PUBLICATIONS

Shen, L., Wang, M. & Shen, R. 2009, Affective e-Learning: Using "Emotional?Data to Improve Learning in Pervasive Learning Environment", Journal of Educational Technology & Society, vol. 12, No. 2, pp. 176-189.*

Baños, R. M. et al. (2004) 'Immersion and Emotion: Their Impact on the Sense of Presence', CyberPsychology & Behavior, 7(6), pp. 734-741. doi: 10.1089/cpb.2004.7.734.*

Lee, J. and Hong, I.B., 2016. Predicting positive user responses to social media advertising: The roles of emotional appeal, informativeness, and creativity. International Journal of Information Management, 36(3), pp. 360-373.*

Bids, O. et al., "Compression of Probabilistic Volumetric Models using multi-resolution scene flow," Image and Vision Computing, vol. 64, p. 79-89. 2017.

McDuff, D. et al., "Do Emotions in Advertising Drive Sales?", ESCMAR vol. C13 CON, p. 1-16. 2013.

McDuff, D., "Crowdsourcing Affective Responses for Predicting Media Effectiveness," Thesis Paper submitted to the Program in Media Arts and Sciences. Massachusetts Institute of Technology. Jun. 2014.

* cited by examiner

DATA PROCESSING METHODS FOR PREDICTIONS OF MEDIA CONTENT PERFORMANCE

CROSS REFERENCE TO RELATED APPLICATION

The present application claims priority to Great Britain patent application serial No. 1620476.0, filed Dec. 2, 2016, which is hereby incorporated by reference in its entirety.

FIELD OF THE INVENTION

The invention relates to a computer-implemented method of data processing of raw input data for predicting performance data for a piece of media content consumed by one or more users. In particular, the invention relates to gathering raw data regarding the behavioral, physical and emotional state of a user as the user consumes the piece of media content, which is then processed using media content analysis techniques to predict a real world effect caused by the consumption of the piece of media.

BACKGROUND OF THE INVENTION

Advertising aims to induce changes in a consumer's emotional state in the real world, and to translate this change in emotional state into performance, such as sales lift. For example, a television commercial may look to increase sales of a product to which it relates. Real world effects may be any objectively measurable outcome that can be linked with consumption of the piece of media content. The outcome may be indicated by predicted performance data. Predicted performance data may relate, for example, to predicted sales lift (e.g., where the media content is an advertisement aimed at selling a particular product), or social media response (e.g., likelihood of going viral), or likelihood of winning an award (e.g., a Cannes Lions award for advertising). For example, performance data can be predicted based on properties of user emotional responses that are collected as a piece of media content is consumed. Over $80 billion is spent annually on television commercials in the US alone. There is therefore a large demand for being able to evaluate the effectiveness of media content prior to publication, by predicting performance.

One conventional option for measuring advertising performance effectiveness is to correlate a given piece of media content with sales performance. However, such correlation is done retrospectively, and comes with the problem of being blind to emotional state of consumers/users.

Another conventional option is to use active feedback, which is also referred to as self-reported feedback, which attempts to determine or predict the performance of pieces of media content, such as video commercials. For active user feedback, users provide verbal or written feedback after consuming a piece of media content. For example, the users may complete a questionnaire, or may provide spoken feedback that can be recorded for analysis, e.g., manually or in an automated manner using speech recognition tools. Feedback may include an indication of emotional state experienced while consuming the piece of media content.

In order for active feedback to be scalable to large sample sizes, and thus be worthwhile, the feedback format must be short, for example limited to yes-or-no answers. This precludes a real-time, i.e., second-by-second, account of experienced emotional state. It is therefore not possible using conventional active feedback techniques to collate representative emotional state data for large sample sizes using active feedback.

Also, active feedback from users pulls from rationalized, conscious thought processes, rather than the (passive) emotional state actually experienced. It has been shown that user preferences are outside of conscious awareness, and strongly influenced by passive emotional state. Media content performance therefore cannot be accurately predicted using active emotional state feedback.

Active feedback is an example of measuring user emotional state using self-reporting. Emotional state data can also be measured in a passive manner, e.g., by collecting data indicative of a user's behavioral or physiological characteristics, e.g., while consuming a piece of media. In practice, it can be desirable to use a combination of raw data inputs comprising behavioral data, physiological data and self-reported data in order to obtain emotional state information. A combination of raw data from two or three of the sources mentioned above may be useful in identifying "false" indicators. For example, if emotional state data derived from all three sources overlaps or is aligned, it gives more confidence in the obtained signal. Any inconsistency in the signal may be indicative of a false reading.

Physiological parameters can be good indicators of what emotional state is being experienced. Many physiological parameters are not consciously controllable, i.e., a consumer has no influence over them. They can therefore be used to determine the true emotional state of a user consuming a piece of media content, which can in principle be used to accurately predict media content performance. Examples of physiological parameters that can be measured include voice analysis, heartrate, heartrate variability, electrodermal activity (which may be indicative of arousal), breathing, body temperature, electrocardiogram (ECG) signals, and electroencephalogram (EEG) signals.

It is increasingly common for users to possess wearable or portable devices capable of recording physiological parameters of the type described above. This opens up the possibility that such physiological measurements may be scalable to large sample sizes, which may enable statistical variations (noise) to be removed so that correlation with media content performance can be seen.

The behavioral characteristics of a user may manifest themselves in a variety of ways. References to "behavioral data" or "behavioral information" herein may refer to visual aspects of a user's response. For example, behavioral information may include facial response, head and body gestures or pose, and gaze tracking.

In one example, facial responses can be used as passive indicators of experienced emotional state. Webcam video acquisition can be used to monitor facial responses, by capturing image frames as a piece of media content is consumed by a user. Emotional state can therefore be captured through the use of webcams, by processing video images.

Emotional state information measured in this way has been shown to correlate with media content performance, and in particular sales lift. The proliferation of webcams on client devices means that capture of this type of data can be scaled to large sample sizes.

However, even conventional passive techniques face various problems. Correlation between facial expression and media content performance has poor accuracy. It has been shown, for example, that the correlation of media content performance with facial expression can be higher than with active feedback, but only when the source data is significantly filtered. Content performance and facial expression correlation is also not applicable to every product category. Whilst these webcam-based techniques demonstrate a positive correlation between facial expression and media content performance, accuracy and consistency across product ranges is not achieved.

Therefore, there exists a need in the art to solve the problems of inaccuracy and inconsistency of evaluating consumer emotional state across different product categories, as well as the difficulty of large-scale data scaling, posed by conventional advertising performance evaluation techniques.

SUMMARY OF THE INVENTION

According to a broad aspect of the methods described herein, there is provided a computer-implemented method of predicting performance data for a piece of media content that is consumable by a user at a client device. In one or more embodiments, the piece of media content is consumable by a plurality of users, each of the plurality of users being at a respective client device. For example, the piece of media content can be any of a live video stream, a video commercial, an audio commercial, a movie trailer, a movie, a web advertisement, an animated game, or an image.

In accordance with one or more embodiments described herein, the method includes collecting, at the client device, raw input data indicative of a response of the user to the piece of media content during consumption of the piece of media content. The client device is communicable with a server device over a network, and the processing of the collected raw input data occurs at the server device in one or more embodiments. The raw input data includes any of user behavioral data, user physiological data or metadata relating to the piece of media content. For example, the raw input data includes image data captured at the client device or audio data captured from an audio capture device. Image data can include a plurality of image frames showing facial images of a user. Continuing with this aspect, the method processes the collected raw input data to: extract a time series of descriptor data points, and obtain a time series of emotional state data points. For example, the step of processing the collected raw input data is performed by determining the predictive parameter, applying a linear regression to the predictive parameter to output a linear regression output, binarizing the linear regression output to produce a binarized output, and applying a logistic regression to the binarized output to output the predicted performance data. In one or more embodiments, each emotional state data point is determined based on one or more descriptor data points. In one or more embodiments, each descriptor data point includes a quantitative parameter that is indicative of a feature extracted from the raw input data. For example, the predictive parameter can be a function of relative change of the quantitative parameter between adjacent emotional state data points in the time series of emotional state data points. In one or more embodiments, each emotional state data point includes a quantitative parameter that is indicative of user emotional state. For example, the predictive parameter can be a function of relative change of the quantitative parameter between adjacent emotional state data points in the time series of emotional state data points. In one or more embodiments, each descriptor data point is a facial feature descriptor data point. For example, each facial feature descriptor data point can be a multi-dimensional data point, each component of the multi-dimensional data point being indicative of a respective facial landmark. Each facial feature descriptor data point can encode information that is indicative of a plurality of facial landmarks. In one or more embodiments, each facial feature descriptor data point is associated with a respective frame.

Continuing with this aspect, the method outputs predicted performance data for the piece of media content based on a classification model that maps between performance data and a predictive parameter of the time series of descriptor data points or the time series of emotional state data points. The predictive parameter can be a quantitative indicator of relative change in the response of the user to the piece of media content. In one or more embodiments, the performance data is sales lift data.

In one or more embodiments, the method additionally determines an individual predictive parameter from the time series of descriptor data points or the time series of emotional state data points for each of the plurality of users, and determines a group predictive parameter from the individual predictive parameters of the plurality of users, in which the predicted performance data is obtained using the group predictive parameter. In one or more embodiments, processing the collected data includes inputting the group predictive parameter into a classification model that maps between the group predictive parameter and the performance data. For example, the predicted performance data output is generated using a result output from the classification model. In one or more embodiments, the method further includes obtaining a plurality of group predictive parameters, wherein the classification model maps between the plurality of group predictive parameters and the performance data.

In one or more embodiments, the method further includes calculating a temporal difference $dx_i^j$ between the extracted time series of the descriptor data points or the time series of emotional state data points, in which $$dx_i^j = \frac{dx^j}{dt_i},$$

and wherein $x^j(t)$ is a time series of a quantitative parameter x of the extracted descriptor data point or the extracted emotional state data for a user j. Then, the method normalizes the temporal difference to produce a normalized temporal difference $dx_i^{j*}$ by subtracting an average difference $\langle dx^j \rangle$ from the temporal difference ($dx_i^{j*}=dx_i^j-\langle dx^j \rangle$), in which $$\langle dx^j \rangle = \frac{\sum_{i=0}^{T} dx_i^j}{T},$$

and T is a duration of the time series. Thereafter, the method segments the time series into a plurality of time bins having a predetermined duration and calculates a maximum of the normalized differences according to $mx_k^j=\max_{i \in k}(dx_i^{j*})$, wherein the notation i ∈ k means that the ith value falls in bin k. The method then weights and sums the values of each of the plurality of time bins according to $$Dx^j = \sum_{k=1}^{n} w_k * mx_k^j,$$

in which n is the number of bins so there is no more frame or segment index of the variable. In one or more embodiments, the method normalizes $Dx^j$ by the length of the piece of media content. Next, the method generates a descriptive statistic indicative of the predictive parameter across the plurality of users.

The user response may be a user's emotional state. In other words, it has been observed that performance data can be obtained by mapping from the predictive parameter, which reflects the scale of change in a user's response (e.g., emotional state) within a time series of data points. The predictive parameter is thus a property of dynamic information relating to a user's emotional state, which can provide a significant improvement in performance prediction over previously used static parameters.

BRIEF DESCRIPTION OF THE DRAWINGS

Embodiments of the invention are discussed in detail below with reference to the accompanying drawings which are meant to be exemplary and not limiting, in which like references are intended to refer to like or corresponding parts, and in which.

DETAILED DESCRIPTION OF THE INVENTION

Figure 1:
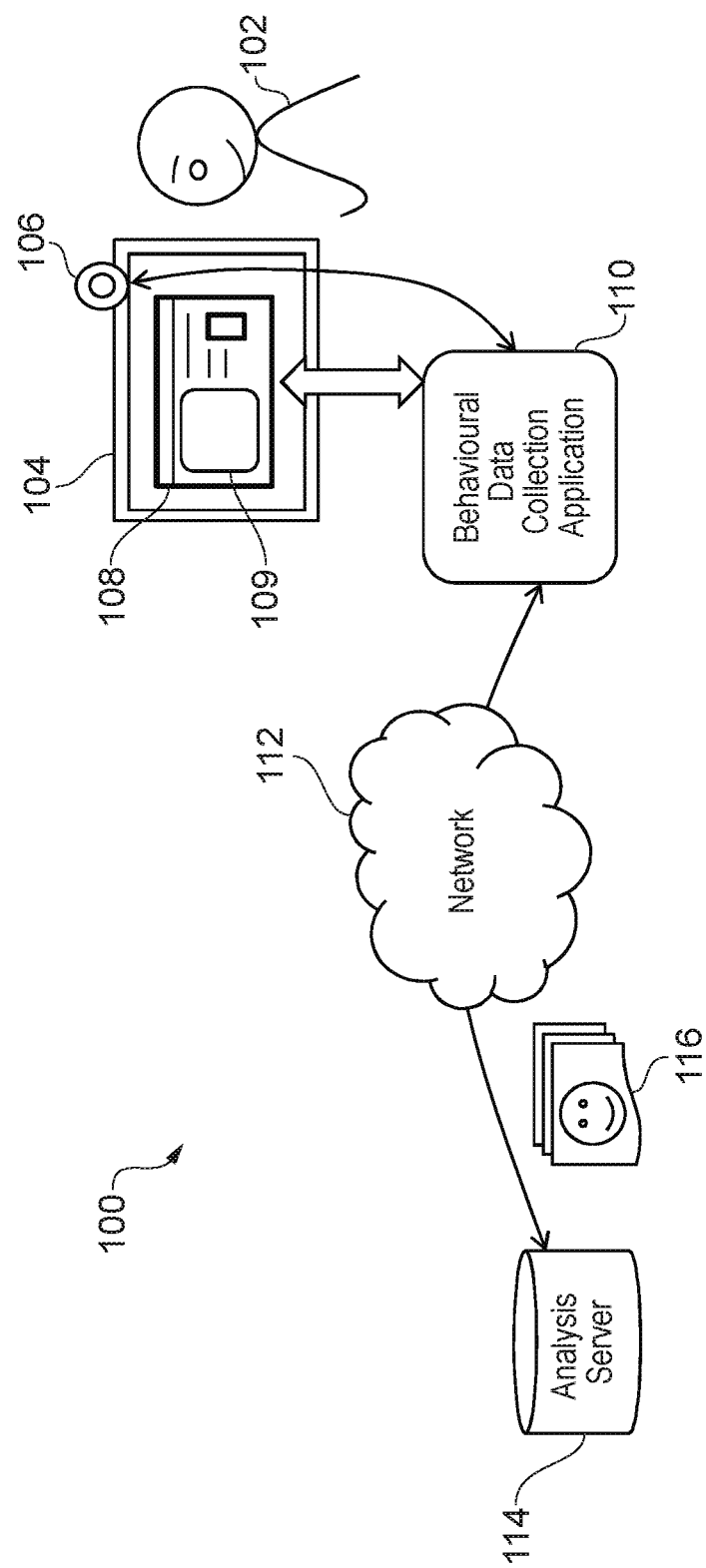
FIG. 1 is a schematic drawing of a system for implementing a method that is an embodiment of the invention.

Throughout the specification, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. Similarly, the phrase "one or more embodiments" as used herein does not necessarily refer to the same embodiment and the phrase "at least one embodiment" as used herein does not necessarily refer to a different embodiment. The intention is, for example, that claimed subject matter includes combinations of example embodiments in whole or in part At its most general, the methods disclosed herein propose data analysis techniques that enable accurate and representative predicted performance data to be extracted from collected raw data of user responses to a piece of media content.

In one aspect, the techniques set forth herein use dynamic analysis of collected raw data to yield properties or parameters that map with greater accuracy to media content performance than properties available using static analysis. In a dynamic analysis, the focus is on the temporal dynamics (i.e., changes over time) of one or more signals obtained or extracted from the collected data. For example, the raw data may be processed to yield information indicative of user emotional state over time, e.g., throughout the duration of consumption of a piece of media content.

Previously employed methods have largely ignored such dynamic cues. In these previous methods, performance prediction was only achieved for certain product categories, and only when average commercials (half of the data) were discarded.

In accordance with broad aspects of the invention, the methods in one or more embodiments include collecting input data regarding the response of a user consuming a piece of media content, processing the collected input data to extract a time series of descriptor data points and obtain a time series of emotional state data points, and outputting a prediction of performance data for the piece of media content. The output prediction may be based on a classification model mapping between performance data and one or more predictive parameters of the time series of descriptor data points or the emotional state data points. A predictive parameter is a quantitative indicator of relative change in the user's response to the piece of media content.

In practice, the piece of media content may be consumable by a plurality of users, each of the plurality of users being at a respective client device. In one or more embodiments, the methods disclosed herein include collecting, at each of a plurality of the respective client devices, raw input data indicative of a plurality of user responses to the piece of media content.

The methods disclosed herein may be usefully implemented in a networked environment to increase computer resource use efficiency. For example, each client device may be communicable with a server device over a network, in which the processing of the collected raw input data can occur either locally or at the server device. Conventional techniques that rely solely on remote processing may suffer from bottlenecking issues when implementing real-time data collection as a user consumes a piece of media content. In this way, local processing facilitates more efficient load management. Local processing also assists in addressing privacy concerns.

The client devices may be distributed at a variety of locations, e.g., in each user's home, or may be present at a central location, e.g., to enable the methods disclosed here to be used in a central location test (CLT) environment.

Using the computer-implemented methods disclosed herein, performance data can be accurately and consistently extracted from media content in a wide range of product categories, and for a wide consumer demographic. Advantageously, performance data is accurately and reliably predicted using passive emotional state indicators as media content is consumed by users. Moreover, performance data is extracted without requiring users to provide active (e.g., written or spoken) emotional state feedback.

Each emotional state data point may include a quantitative parameter that is indicative of user emotional state. The quantitative parameter can be a score or other numerical parameter.

The predictive parameter may be a function of relative change of the quantitative parameter between adjacent emotional state data points in the time series of emotional state data points. In one example, the predictive parameter may be indicative of a difference between a value of the quantitative parameter associated with the end of the media content and a value of the quantitative parameter associated with the remainder of the media content.

The user emotional state may include one or more emotional state selected from anger, disgust, fear, happiness, sadness, and surprise. Other emotional indicators may be used, such as valence and/or arousal. Where the media content concerns commercial advertising, signals that encode disgust and surprise can exhibit strong correlation with performance data corresponding to sales lift.

The raw input data may comprise any of user behavioral data, user physiological data and metadata relating to the piece of media content. The raw input data collected from the plurality of users may be aggregated, and the predictive parameter may be generated from a time series of descriptor data points and/or a time series of emotional state data points that is representative of or obtained from the aggregated raw input data. Alternatively or additionally, an individual predictive parameter can be determined from the time series of descriptor data points and/or the time series of emotional state data points for each of the plurality of users. A group predictive parameter may then be determined from the individual predictive parameters of the plurality of users, whereby the predicted performance data can be obtained using the group predictive parameter. Thus the signal that is indicative of performance may be obtained in two ways. It may be obtained at an individual level (i.e., for each user) and then aggregated or otherwise analyzed (e.g., using various statistical measures) to provide an input for the predictive model, or it may be obtained from group (i.e., already aggregated) data from a plurality of users.

A plurality of predictive parameters may be obtained from the collected input data. By building the predictive model on a plurality of signals that exhibit correlation with the same desired output parameter, more confidence can be assigned to the output. Moreover, if a plurality of predicted parameters are used, the input to the predictive model may possess some diagnostic value for situations where a prediction proves to be incorrect. Thus, the quantitative parameter time series signals that lie behind the predictive parameter may serve a dual function: to predict performance, and to assist in explaining why a piece of media content is performing as expected or not. For example, if one or more a set of predictive parameters yield a "bad" output while the others are good, the "bad" outputs can be investigated to give feedback on the media content. This feedback may be used to optimize the media content before release.

Processing the collected data to output predicted performance data may include inputting the predictive parameter into a classification model (e.g., a computer-based predictive model) that maps between the predictive parameter (e.g., individual predictive parameter or group predictive parameter) and the performance data.

The predicted performance data output may be generated using a result output from the classification model.

The raw input data may be image data captured at each of the respective client devices. The image data may include a plurality of image frames showing facial images of a user. Moreover, the image data may include a time series of image frames showing facial images of a user.

Where the image frames depict facial features, e.g., mouth, eyes, eyebrows etc. of a user, and each facial feature comprises a plurality of facial landmarks, the behavioral data may include information indicative of position, shape, orientation, shading etc. of the facial landmarks for each image frame.

The image data may be processed on respective client devices, or may be streamed directly to the server device over the network for processing.

Each descriptor data point may be a facial feature descriptor data point, including information indicative of position, shape, orientation, sharing, etc., of a selected plurality of the facial landmarks in the behavioral data.

In other words, each facial feature descriptor data point may encode information that is indicative of a plurality of facial landmarks. Each facial feature descriptor data point may be associated with a respective frame, e.g., a respective image frame from the time series of image frames. Each facial feature descriptor data point may be a multi-dimensional data point, each component of the multi-dimensional data point being indicative of a respective facial landmark.

The emotional state data points may be obtained directly from the raw data input, from the extract descriptor data or from a combination of the two. For example, the plurality of facial landmarks may be selected to include information capable of characterizing user emotion. Each emotional state data point may be thus be determined by applying a classifier to one or more facial feature descriptor data points in one image or across a series of images. In some examples, deep learning techniques can be utilized to yield emotional state data points or other relevant quantitative parameter time series signal from the raw data input. Such deep learning techniques can bypass a requirement for a human to select possible descriptor features and transform them to emotional state information. In principle such techniques may also be used to yield the predictive parameters directly from the raw data input.

The computer-based predictive model may be trained by machine learning with a training set of media content items having known performance data. For example, the training set may be data comprising calculated predictive parameters and corresponding known performance values of a plurality of training pieces of media content.

The piece of media content may be any type of user-consumable content for which information regarding users' feedback is desirable. The invention may be particular useful where the media content is a commercial (e.g., video commercial or advert), where performance can be judged against sales uplift or the like. However, the invention is applicable to any kind of content, e.g., any of a video commercial, an audio commercial, animatics (e.g., relating to a commercial or other video narrative), a movie trailer, a movie, a web advertisement, an animated game, an image, etc.

The performance data may be sales lift data. Moreover, the predicted performance data may be predicted sales lift for a given piece of media content.

Additionally, or alternatively, performance data may be social media performance. For example, performance data may include number/frequency of likes/shares on such social media platforms as: Facebook, YouTube, Twitter. Additionally, or alternatively, performance data may include awards received by the commercial.

Additionally or alternatively, the signal output for any user can itself be used as (or as part of) a classifier tool, e.g., to identify clusters of users to whom certain types of media can be targeted, and/or to assign users to existing clusters.

In one or more embodiments, head pose dynamics and facial expression dynamics are linked with emotional state and change in emotional state, and in which head pose dynamics and facial feature dynamics are combined to provide reliable indications of emotional state and change in emotional state.

In view of the above, the methods disclosed herein perform processing operations on raw data collected during user consumption of media content in order to enable predicted performance data to be extracted for given pieces of media content.

In the examples below, the raw data was image data obtained from recording devices, e.g., webcams or the like, on a user device. As explained below, this raw data provides behavioral information in the form of facial images, from which emotional state information can be obtained. However, the embodiments disclosed herein are not limited to this type of raw data or behavioral information. Rather, the invention provides a new technique that generates and analyzes signals having a useful correlation with performance data. Such signals can in principle be obtained from any type of raw information that is indicative of a user response during consumption of media content. Thus, the raw information may provide any one or more of behavioral information, physiological information or self-reported information of the types discussed above.

The signal or signals that correlate with or can map with strong accuracy to the performance data may be determined beforehand and extracted using techniques similar to those discussed below. Alternatively, signals may not be known in advance. Instead they may be determined using deep learning techniques.

FIG. 1 is a schematic drawing of a system 100 suitable for collecting and analyzing behavioral data, which can be used in the invention. As can be seen from FIG. 1, the computer-implemented method does not have to be performed by a single device, but can be performed across a distributed computer system, e.g., via a computer network 112 (e.g., a wired or wireless network, such as WiFi or cellular) as shown. A single client device 104 in use by a single user 102 is shown in FIG. 1 for simplicity. The client device 104 can be, for example, a PC, tablet PC, mobile phone, or other computing device having a processor, a memory, and can be configured to communicate over network 112. The processor of the client device 104 can implement instructions stored as program code in the memory. A user 102 consumes a piece of media content 109, for example a video commercial downloaded from an ad server and displayed on a video player 108 of client device 104. The media content 109 is a series of image frames, and may include accompanying audio. Simultaneously to the client device 104 playing the media content 109, a webcam 106 operatively coupled to client device 104 collects image data of the user as the user consumes the media content, e.g., as a time series of image frames of the face of the user. In one or more embodiments, the webcam 106 is integral to the client device. In other embodiments, the webcam 106 is a standalone device. The plurality of raw image frames captured by the webcam 106 are passed to a behavioral data collection application 110, which may be stored in a memory or storage on the client device 104 or elsewhere on the network (e.g., cloud storage, remote storage). The plurality of raw images is then processed by the behavioral collection application 110. For example, they may undergo the pre-processing steps discussed below. The behavioral data collection application 110 then transfers that processed information 116 to an analysis server device 114 over the network 112, where a predictive parameter is extracted from the behavioral data, and a predictive model is used to obtain predicted performance data for the piece of media content from the predictive parameter. The predictive parameter can be a quantitative indicator of the relative change in the user's response to the media content, derived from a series of data points indicating a change in a particular facial feature descriptor data point, which may indicate a change in facial expression (i.e., a smile or a frown). The predictive model can be, for example, a classification model as disclosed elsewhere herein. The analysis server 114 can receive similar data from an additional plurality of client devices.

The invention is not limited by the location at which the raw data is processed. For example, the behavioral data collection application 110 may simply forward the raw data received from a client device 104 to the analysis server 114, or may itself extract the predictive parameter and send only that across the network.

Figure 2:
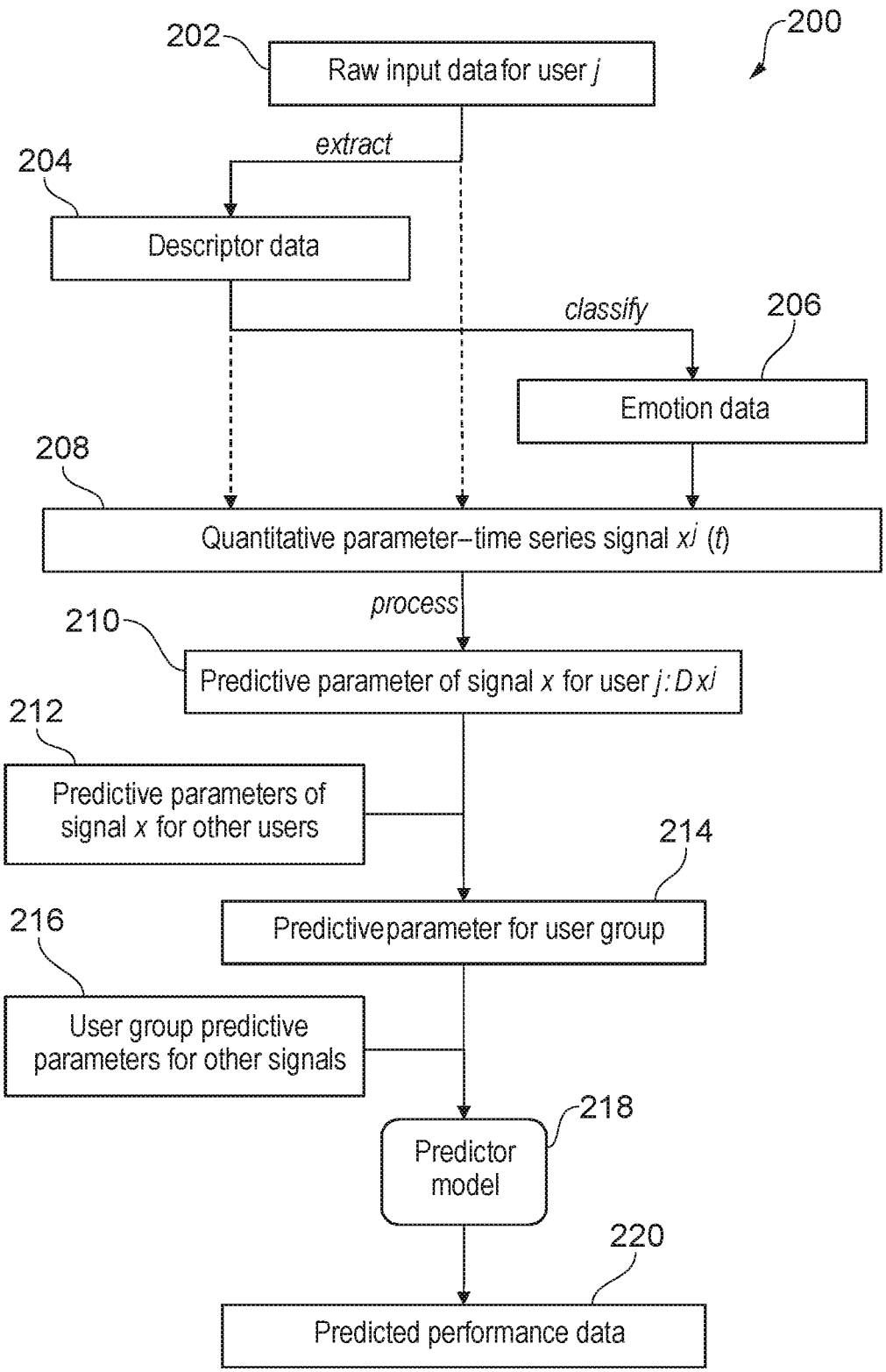
FIG. 2 is a schematic data flow chart that illustrates the relationship between the types of data used in an embodiment of the invention.

FIG. 2 is a schematic data flow diagram that illustrates how information is processed and transformed in one or more embodiments of the invention. The process flow 200 begins with a raw data input 202 for a user j. The raw data may be any suitable source of data that is indicative of a user's ongoing response to a piece of media content. In the specific example give below, the raw data input is image data collected by a webcam on the user's computer. In other examples, the raw data may be any type of self-reported, behavioral or physiological data collected for the user. For example, audio data from the user can be recorded using a microphone, and physiological data can be collected using a wearable device or appropriate sensor (e.g., electromyography sensors, electrodermal activity sensors, LUX light sensors, electrocardiogram sensors).

The raw data input 202 is used to generate one or more time series signals from which a predictive parameter that correlates with a desired output can be calculated. The time series signals are based on a parameter (denoted as x herein) that can be obtained from the raw data input. The raw data input may be manipulated, further processed or refined to generate the time series signal(s) as discussed below. However, it is also possible that the time series signal could be a parameter that is directly observable within the raw data input itself In the example shown in FIG. 2, the process flow 200 then extracts various descriptor data 204 from the raw data input 202 via a processor implementing program code. In a specific example, if the raw data input 202 comprises facial image data, the extracted description data 204 can be information indicative of the relative position or facial feature or geometry (e.g., orientation) of the face or head, or respective parts thereof (e.g., eyes, nose, mouth). The extracted description data 204 may itself contribute to the a time series signal from which a predictive parameter is obtained, or it may be extracted in order to provide an input for an emotional state classifier, from which emotional state data 206 can be obtained. Emotional state data 206 is indicative of a potential emotional state of the user based on the extracted description data 204.

Thus, the raw data input 202 is used to derive one or more time series signals which represent quantitative parameters 208 of a user's response to a piece of media content from which a predictive parameter can be obtained. As explained above, the quantitative parameters may come directly from the raw input data, or may be extracted from it using data recognition or filtering techniques, or may be derived from it by using classification techniques. For example, the location and estimate pose (yaw, pitch, and roll in degrees) of the head/face is determined, and the position of facial landmarks (e.g., nose, eyes, mouth) is determined. The location and estimate pose is measured in these three dimensions in order to gain an accurate portrayal of how the user looks while consuming the media content. This also works to discard received data in which the user is not actively consuming the media content. For example, the quantitative parameters may be derived by filtering out data in which the location and estimate pose indicates the user is not looking at the media content, such as if the yaw or pitch are determined to pass a certain degree threshold (e.g., more than 30 degrees from a baseline), which would indicate that the user's head is turned a distance up, down, left, or right relative to the webcam, and thus is likely not looking at the display showing the media content. Similarly, the position of facial landmarks can give indications that the user is not consuming the media content (e.g., data recognition techniques indicate that the user's eyes are closed for a prolonged period of time). In the example given below, a set of six quantitative parameters are obtained from the raw facial image data input: three head pose signals and three emotional state signals (smile, disgust, surprise).

The time series signals corresponding to each quantitative parameter are then processed to yield a predictive parameter 210, which is a property of the signal that exhibits a correlation with a desired output (e.g., performance data for the media content). The invention utilizes the fact that the quantitative parameter is a time series signal to yield predictive parameters that are a quantitative indicator of relative change in user response within the duration of interaction with the media content. In the example given below, the quantitative indicator expresses a difference between a value of the quantitative parameter for the final portion of the media content and the values for the remainder of the media content. Other expressions can be used.

One or more predictive parameters 210 can be obtained from each quantitative parameter time series 208 for a given user. Each predictive parameter 210 can be a single value that is representative of the relevant relative change in the parameter (e.g., descriptor data or emotional state).

Corresponding predictive parameters 212 can be obtained for a plurality of other users who consume the same media content, whether consuming the media content simultaneously or not. The plurality of predictive parameters for the user group may form a distribution of values, from which a single predictive parameter 214 for the user group can be obtained. In one or more embodiments, the group or "aggregate" predictive parameter 214 is a predetermined statistical property of the distribution of individual predictive parameters. For example, it may be the maximum or minimum value of the distribution, or it may be a particular percentile (e.g., the 75th percentile) or standard deviation. It is desirable to select a predetermined statistical property as the group predictive parameter 214 which exhibits the strongest correlation (positive or negative) with the desired parameter to be predicted.

For any given piece of media content, the process above can be repeated to yield a plurality of group or "aggregate" predictive parameters 216, each corresponding to a given quantitative parameter time series. These predictive parameters form the input signals for a predictive model 218, whose output in this example is predicted performance data 220 for the piece of media content. An example of how the modelling is done is given below.

Figure 3:
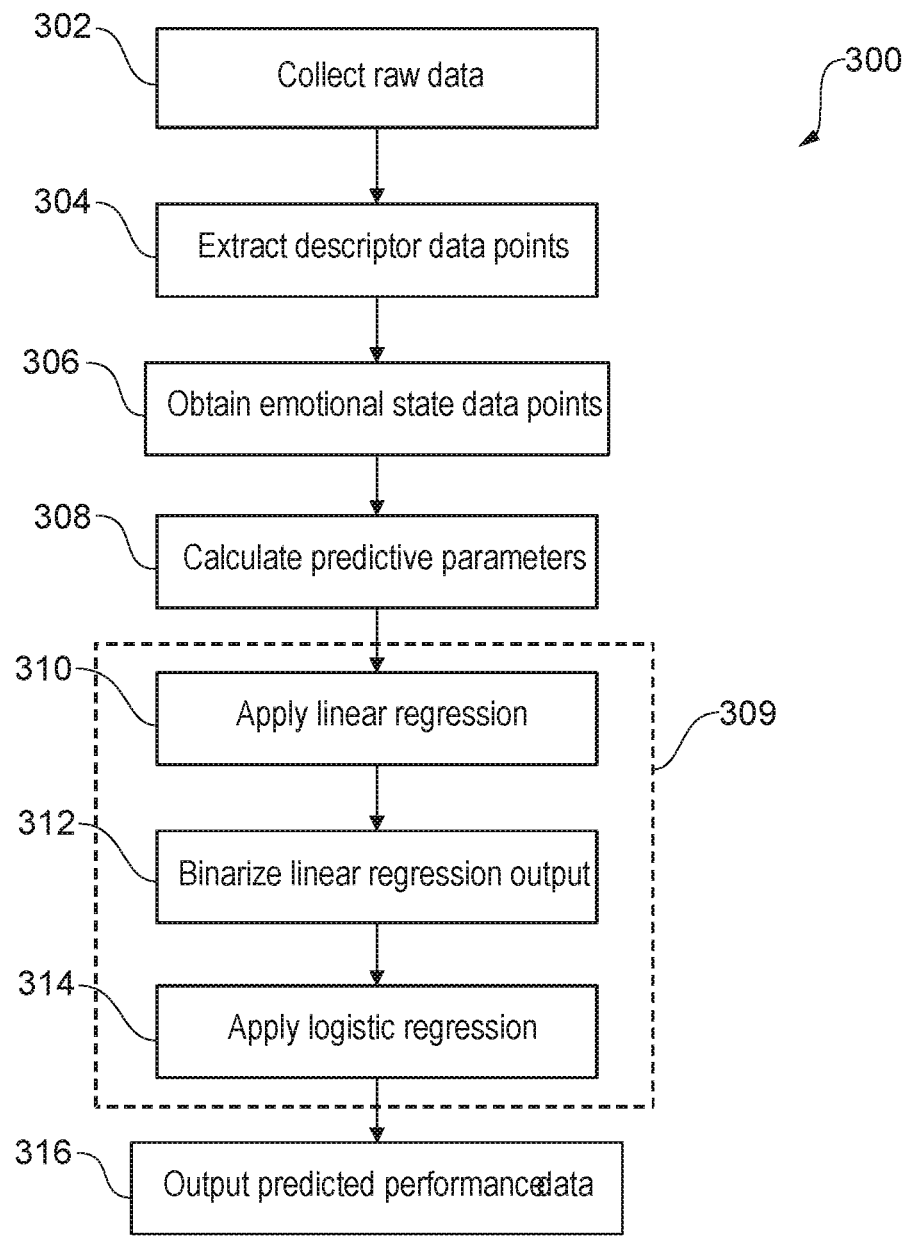
FIG. 3 is a flow chart showing the process steps performed in an embodiment of the invention.

FIG. 3 is a flow chart of a method 300 according to one or more embodiments of the invention. The method 300 may be implemented by the systems described herein, e.g., system 100 having a plurality of computing devices having a processor and a memory, in which the processor implements program code stored in the memory and such program code instructs the processor to perform the steps of the method. The method 300 commences with a step 302 of collecting the raw input data, as disclosed elsewhere herein.

The method 300 continues with a step 304 of extracting descriptor data points (i.e., a time series of descriptor data) from the raw data input. For example, descriptor data points can be extracted from facial image data. The method 300 continues with a step 306 of using the extracted descriptor data points and/or raw data input as an input to a suitable classifier to obtain a set of emotional state data points (i.e., a time series of emotional state data). A classifier is a machine learning tool trained to map the extracted descriptor data points or raw data input to one or more emotional states (e.g., smile, surprise, disgust, etc.). For example, an output from the classifier may be a set of probabilities that the user from which the descriptor data points or raw data input is obtained is exhibiting each of a range of emotions.

Continuing with method 300, in a step 308, the time series data (which may be descriptor data and/or emotional state data and/or the raw data) is used to calculate one or more predictive parameters, as described elsewhere herein. Steps 302 to 308 may be undertaken for raw data collected from a single user or from a plurality of users who consume the same piece of media content. The predictive parameters obtained at step 308 may represent group or "aggregate" parameters that correspond to one or more statistical properties of a distribution of individual predictive parameters obtained from each of the users.

The method 300 continues with a step 309 of performing predictive modelling, which begins by inputting the predictive parameters into a predictive model. In one or more embodiments, step 309 includes various substeps to process the predictive modelling. In this example, the predictive model of step 309 operates in three stages. In a first step 310 of the predictive modelling, a linear regression is applied to the predictive parameters. In a second step 312 of the predictive modelling, the output is compared with a threshold in order to binarize it. In a third step 314 of the predictive modelling, the binarized output is input to a logistic regression whose target variable is the predicted performance parameter (which in the example below is expressed in a simple binary form). The method 300 ends with an output from the predictive modelling step 309, which may be a probability associated with a given performance indicator. Further details of the data flow and method described above will become apparent from the following detailed example.

EXAMPLE

The example described below realizes two objectives. The first objective is to collect in a fast and economic way (in terms of maximizing computer resource efficiency) a large number of spontaneous behavioral responses via webcams to a given set of commercials for which sales lift data is available. The second objective is then to design, implement, and validate a simple and transparent model that can accurately predict sales performance from the available observations.

The results of the example were then compared with a known, conventional static analysis technique that faces the problems of poor accuracy and inconsistency among evaluations of consumer emotional state across different product categories (D. J. McDuff, Crowdsourcing affective responses for predicting media effectiveness, Ph.D. thesis, Massachusetts Institute of Technology Cambridge, Mass., USA (2014); D. McDuff, R. E. Kaliouby, E. Kodra, L. Larguinet, Do emotions in advertising drive sales?, in: Proceedings of ESOMAR Congress, 2013, hereinafter the "McDuff study") to demonstrate that the method of the invention provides a reliable and practical tool for analyzing behavioral responses at scale for market research purposes.

Data Collection

In this example, national census-based panels of paid participants (average panel size was 277 subjects) were recruited in six countries by third-party field agencies. All subjects gave permission to be approached for market research purposes and provided demographic data which is then used when a particular panel (sample) is needed. Prior to recording, each subject gave permission to record their face and to use the recording in further analysis. Standard ethical norms in the field of market research were followed. Responses of the participants were recorded remotely via their own home computer and web-cam. Asking people to view videos in this way is a well-validated procedure for eliciting emotional responses. Implicit evidence for spontaneous behavior is that participants often forget they are being recorded and leave the room or become engaged in unrelated activities like talking, eating, etc.

In addition to demographics constraints, there were two more selection criteria. The technical requirement was that each participant has internet access and web-cam attached to her home computer. The relevance requirement was that commercials should be displayed only to participants interested in the product category of the advertisement ("category users"), thus making the ads relevant. This is in contrast to the McDuff study, where only 76% of the participants were actual category users. The total number of participants was 18793, but for quality reasons described below only 12262 sessions were finally used in the analysis.

The commercials represented four product categories: confections, food, pet care, and chewing gum. They were originally aired between 2013-2015 in six different countries. The commercials varied in duration between 10 and 30 seconds.

Sales lift data for the commercials was obtained. A target score was derived from the actual contribution of the ad campaign to "sales lift." To measure sales lift for each commercial, exposed and control (unexposed) comparison groups were identified and their actual purchases were traced. The ratio of purchase propensity in the exposed group to the comparison group was then averaged over the set of exposed/comparison groups. Sales lift rating was quantified on a four-point ordinal scale for training classifiers.

The regression task was simplified into a binary problem: commercials with rating 1 and 2 are converted into a "low" performance class, while a "high" performance class is designated for ads with rating 3 and 4. However, it can be noted that the additional information encoded in the original ordinal scale was used in training part of our predictive model.

In this example, the analysis was complicated by the fact that about a third of the commercials were variations of each other. Two commercials are considered as variations of one another if differences between them were due to small edits in length or content. As an example, some commercials had the same storyline, but displayed a different brand label or were produced in a different language. In the results section below, we report separately for all commercials and for the case in which related ads are combined into a single label.

The design of the example here is similar to the McDuff study with which it is compared below, except for the following differences: (1) two additional countries are included in the present example; (2) the commercials used in the McDuff study aired in 2002-2012; the ones used in the present example aired more recently; (3) The McDuff study set contained 163 unique commercials; the present example contains 116 unique ones out of the available 147 commercials; and (4) sales lift in the McDuff study was quantified on a 3-point ordinal scale, while the present example is on a 4-point ordinal scale.

All commercials were viewed by participants on their own computer while their face was recorded by web-cam and streamed to a server, e.g., using a system similar to that described in with respect to FIG. 1. Image resolution was 640×480. This "in the wild" setting ensures more ecologically valid spontaneous behavior than would be possible in a laboratory at the cost of image quality and frame rate. Average frame rate was about 13 fps. Videos were omitted if face was occluded or subjects were engaged in unrelated activities like talking or eating.

Subjects viewed up to four commercials presented in a random order. Session length was approximately 10 minutes. By contrast, in the McDuff study, subjects watched 10 commercials presented in a random sequence and completed self-report ratings between them; session length averaged 36 minutes. A shorter format was chosen for the present example because other studies have found a negative correlation between session length and data quality. In addition, larger samples (on average 277 subjects viewed each ad versus 100) were used to counter the impact of video quality as well as large variations in the observability of the viewers' responses.

Even after applying the conservative quality filtering discussed below, the effective mean sample size in the present example was 164, which is significantly larger than that reported in the McDuff study.

Data Processing

In an initial step, the collected raw data is processed in four ways. Firstly, recordings that do not match in duration with the ad (maximum difference was set to 1.5 sec) are discarded. These are recordings in which the web-cam may have recorded user reactions that occurred after the advertisement was complete. Recordings where a delay between any of the subsequent frames is longer than 2 sec were also dropped. These are recordings in which there may have been network connectivity issues that caused delays in delivering the advertisement to the participant. Secondly, color frames were converted into grayscale intensities. Thirdly, facial features were extracted and input to classifiers for emotion detection. Fourthly, the extracted facial features as well as the output of the emotion algorithms were used to form time series signals for predictive modelling.

In order to compensate for noise and to help temporal alignment of time series corresponding to the same ad, it may be possible to apply zero phase smoothing and resampling on all observations, as is known in the art. However, these steps were not performed in the present example, because some of the descriptive statistics like variance distribution in a given time window may be quite sensitive to such steps.

For each frame, the location and estimate pose (yaw, pitch and roll in degrees) of the head/face was determined, and the precise position of a set of facial landmarks (alignment of key points) was located using known techniques. If the determined location and estimate pose, or the facial landmarks indicate that the subject is not currently engaged in consuming the media content, the system may filter those image frames out from the analysis. For example, the system may determine that the subject's head was turned away from the webcam or its eyes were closed for a prolonged period, and lower the weight of, or disregard entirely, those image frames. This information corresponds to the descriptor data referred to above.

Local geometry of the landmarks as well as texture patches around them were used as descriptors for an classifier trained to classify facial expressions into discrete expression categories such as smile, surprise or disgust.

The most frequent facial expression is the smile. Smiles may convey enjoyment, favorable appraisal, anticipation, and action tendencies to approach. From perspective of automated detection, smiles often involve relatively large geometric and textural deformations that are advantageous.

Since most of the advertisements in the example data set were designed to be amusing or joyful, it is expected that signals derived from identifying a smile carry information about the elicited emotional states. Additionally, surprise and disgust related signals are particularly informative for the sales prediction task.

The output from the processing stage in the present example is a multi-dimensional time series of estimated head pose and three facial expression classifier output together with their corresponding probability output (posterior probability that a class label is chosen for a given set of descriptors).

In searching optimal representations for the sales prediction task, it is desirable to identify features that display temporal changes that correlate with the evolution of the response eliciting stimulus (i.e., media content or ad in the present example). When these features are identified, the raw data correlated with such features can be passed to the classification model to produce improved predictions of the user's experience of the media content. In addition, it is desirable to avoid point-wise aggregation of individual responses and to provide a common procedure for all signals thus avoiding the need of additional parameter optimization. In this way the resulting model will be robust and less sensitive to the particular properties of the training data set.

The common approach was the following.

1. For each time series obtained from the head pose estimator and the facial expression classifiers, temporal differences are calculated between subsequent frames (detrending) in a given recording:

$$dx_i^j = \frac{dx^j}{dt_i}$$

in which $x^j(t)$ is a time series of a quantitative parameter x of the extracted descriptor data or classified emotional state data for a user j. The term $dx_i^j$ therefore represents a temporal difference at time i for subject (user) j.

2. The temporal differences from step 1 are normalized by subtracted an average difference for that time series, i.e., $$dx_i^{j*} = dx_i^j - \langle dx^j \rangle$$

in which $$\langle dx^j \rangle = \frac{\sum_{i=0}^{T} dx_i^j}{T}$$

and T is the duration of the time series.

3. The time series is then segmented into a plurality of time bins having a predetermined duration (e.g., four seconds). The time bins thus represent temporal segments for each recording, regardless of the frame rate or the duration of the entire recording.

4. For each bin the maximum of the normalized differences is calculated:

$$mx_k^j = \max_{i \in k}(dx_i^{j*})$$

in which the notation i ∈ k means that the ith value (frame) falls in bin k. The actual number of values may vary between the different bins.

5. In this example, the bin values are then weighted and summed up to yield one number (the predictive parameter $Dx^j$) that describes the differences between the last 1 or 2 segments (bins) and the rest:

$$Dx^j = \sum_{k=1}^{n} w_k * mx_k^j$$

in which n is the number of bins so there is no more frame or segment index of the variable.

The applied weight vector in this example is a simple zero sum step function, i.e., $\Sigma_k w_k = 0$.

6. To make comparable the features for ads of different duration, the resulting sum was normalized by the length of the given ad.

7. From a set of predictive parameter values obtained from a plurality of users, a particular descriptive statistic (e.g., standard variation or 75th percentile) is calculated and subsequently used as an "aggregate" value indicative of the predictive parameter across the group of users. These signal values thus describe the sample response to a given stimulus and do not depend on time or subject indices.

8. To diminish aliasing effects due to the arbitrary segment boundaries, bins were shifted in both directions up to 0.25 seconds and all steps above were repeated. The finally obtained sample signal is then the average of these calculations. This step, while not necessary, makes the approach more robust.

Additional optimization of this procedure (like varying time bins, various forms of normalization, use of different weight functions, etc.) would likely yield better performance, but such fine tuning may raise concerns about overall robustness and feasibility of the approach. Bin size, for example was defined based on the average frame rate and the duration distribution and onset dispersion of the annotated events in our proprietary training data set. If small perturbations of the select parameters show graceful degradation in the correlation, then the parameter can be considered to be robust. While the McDuff study relies on simple summary statistics of aggregate sample responses, such as maximum or gradient of a linear fit, the present example operates on the principle that dynamics of the elicited emotional responses analyzed at the subject level before aggregation will be more robust and distinctive. In addition, the present example does not assume uniform video frame rate, which is often difficult to achieve with remote recordings.

Of several candidate features, three signals derived from various facial expressions and three other signals derived from head pose are selected for use in the present example. The source of the signals, the descriptive statistics used in the signal and their Pearson correlation with the binary sales lift scores are shown on Table 1.

TABLE 1

The table shows the selected signals (simple summary statistics), the corresponding source and the Pearson correlation with the sales lift score.

| Source of signal | Descriptive statistics | Correlation |
| --- | --- | --- |
| Smile | $75^{th}$ percentile | 0.41 |
| Disgust | $75^{th}$ percentile | 0.35 |
| Surprise | maximum | 0.31 |
| Head pose (Roll) | standard deviation | 0.28 |
| Head pose (Roll) | minimum | −0.26 |
| Head pose (Roll) | $75^{th}$ percentile | 0.32 |

FIGS. 4A to 4D illustrate the major steps of the proposed signal generation process from observations on individual subjects to sample distribution (aggregate panel response) and to the final signal value assigned to the corresponding advertisement. The illustrated steps relate to classification of the "surprise" signal for a given advertisement.

Figure 4A:
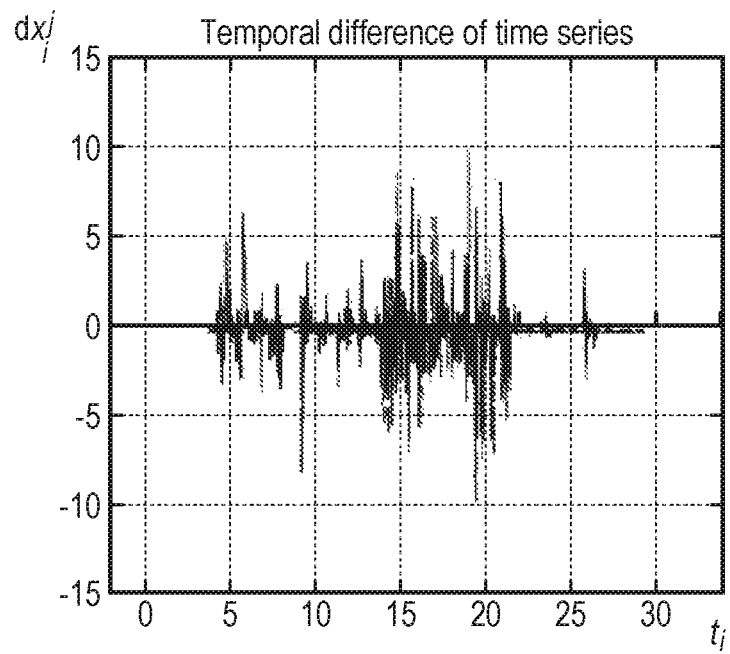
FIG. 4A is a graph showing temporal differences in an emotional state quantitative parameter, obtained from a time series of that emotional state quantitative parameter.

FIG. 4A is a graph showing temporal difference calculated from the output of the surprise classifier for a given subject.

Figure 4B:
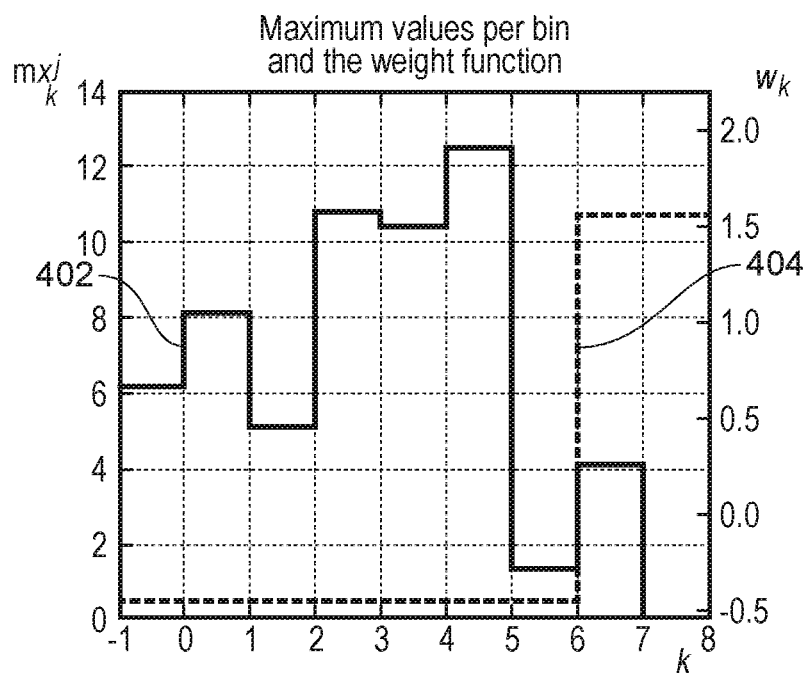
FIG. 4B is a graph showing the maximum normalized temporal differences obtained from the graph of FIG. 4A for a series of predetermined time bins.

FIG. 4B is a graph showing two line plots. The first line plot 402 shows the maximum values of the normalized temporal differences for each time segment ($mx_k^j$). The second line plot 404 shows the weight function $w_k$ that assigns a positive or negative weight to each bin. The weighted sum of the bin values characterises the surprise response of one subject.

Figure 4C:
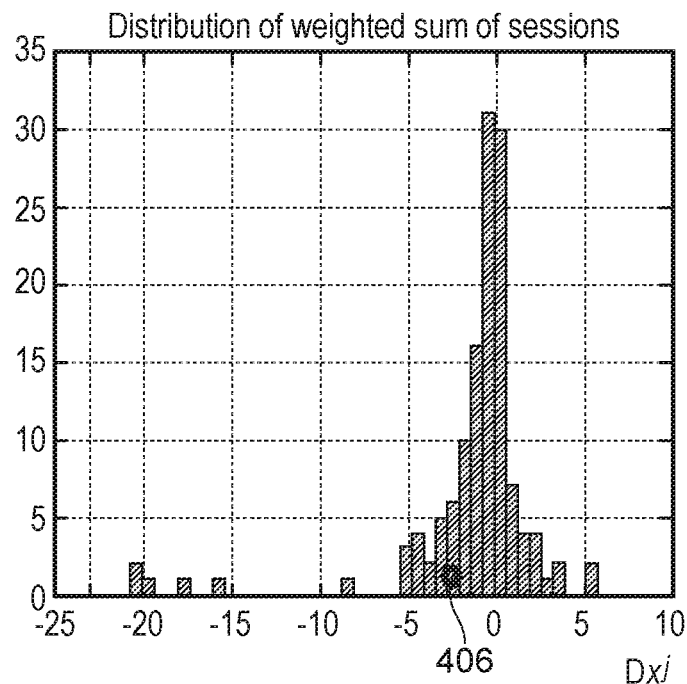
FIG. 4C is a chart showing a distribution of predictive parameters obtained from a plurality of user responses.

FIG. 4C shows a distribution of the individual surprise response calculated in the previous step for the sample of users. The particular example of FIG. 4B is denoted by a dot 406. For the final "surprise" signal of the given advertisement we selected the maximum value over the subjects in a given panel (see Table 1 above). For other signals a different property of this distribution can be selected as the final output.

Figure 4D:
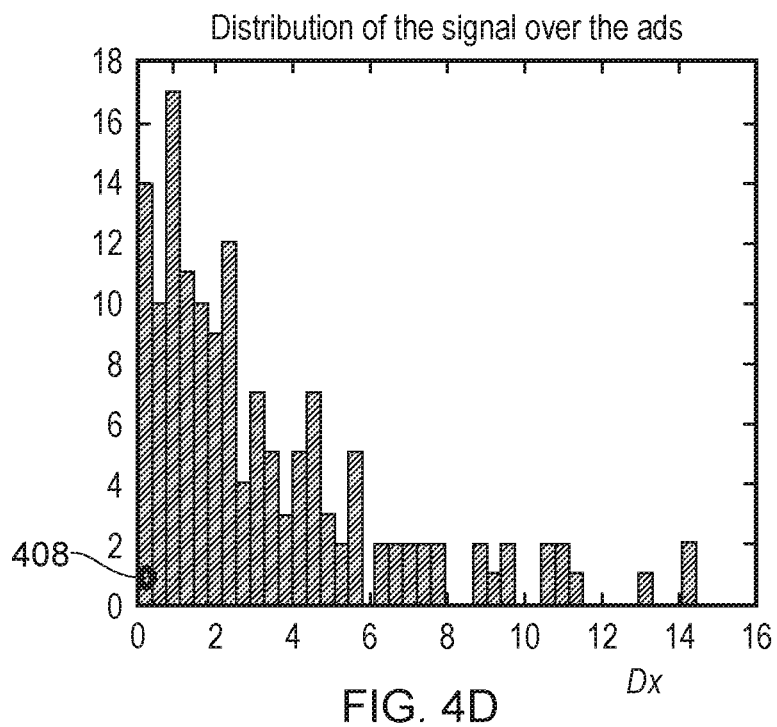
FIG. 4D is a chart showing a distribution of aggregated predictive parameters for a plurality of different media.

FIG. 4D shows a distribution of the final output "surprise" signals over the advertisements. The calculated signal of the ad that yielded the distribution shown in FIG. 4C is denoted by a dot 408. Since we found positive correlation between this signal and sales lift data, this particular ad most likely belongs to the low performing class.

For this example, there is a positive correlation between the scores and the disgust based signal. Additionally, all head pose related signals indicated more frequent or larger head pose changes near the end of the sessions (combination of roll, pitch and yaw did not yield higher correlation, so roll based signals only are used). Previous work has found that gaze direction strongly correlates with head pose so larger head pose variations may reflect a lasting effect of the stimulus content and do not correspond to the very last segment of the stimulus, since subjects with extreme head pose do not look at the direction of the screen.

It was also found that for all but the surprise signal only the very last segment was assigned with positive weight (that is all signals measure differences between the very end and the rest of the recordings). For "surprise" it was found that even higher correlation can be achieved by assigning positive weight to the last two segments covering 8 seconds. This deviation may indicate that surprise responses are less synchronized (temporal onsets are dispersed) and duration may also vary.

It is believed that due to the small data size (number of commercials to be tested), it is difficult to give a more thorough and plausible interpretation of the findings other than emphasizing the fact that both facial expressions and head pose related signals carry complementary information about sales performance.

In comparison, the signals of the McDuff study were extracted from a mix of facial action unit activations which are strongly related to particular discrete expressions (eye brow raise is often associated with surprise), discrete expressions (smile) as well as "valence" which was derived from the estimated intensity of all discrete facial expressions. In contrast, the present example uses a simpler mix of two signal types, one related to discrete emotion categories (smile, disgust and surprise), while the other one related to head pose changes which are less difficult to measure than facial action units. This simpler mix which does not require determination of entire facial action units therefore requires less computing power to achieve.

Modelling

Limited sample size and potential label noise makes modelling difficult or even impossible if the complexity of the used approach is high. The present example uses simple ensemble modelling with averaging with the following assumptions: (1) signals are treated as independent and do not consider higher order interactions between them, which allows for training simple (weak) experts whose votes can be summarized in an ensemble model; and (2) linear relationships are sought between signals and target score and non-linearity is induced by thresholding (binarization of the individual experts' output). Such thresholding supports signal denoising. The work flow of the model used in the present example is shown in FIG. 5.

Figure 5:
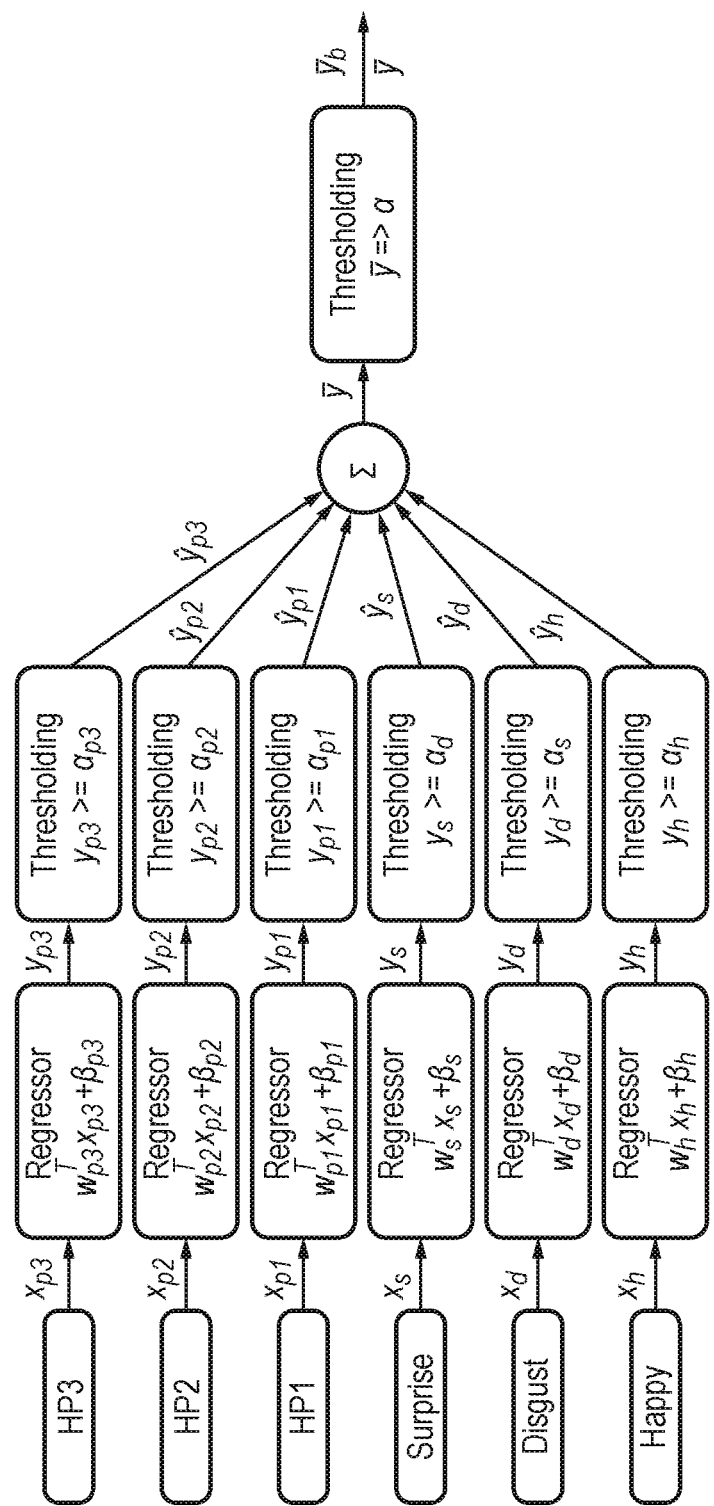
FIG. 5 is a schematic flow diagram that illustrating a predictor model used in an embodiment of the invention.

In FIG. 5 there are five inputs to the model: three head pose signals ($x_{p1}$; $x_{p2}$; and $x_{p3}$) and three facial expression related signals ($x_s$; $x_d$; and $x_h$, pertaining to surprise, disgust, and happy respectively), as described above. In one or more embodiments, the three head pose signals pertain to yaw, roll, and pitch of the head of a user, respectively. Some of the three head pose signals and the three facial expression related signals that indicate the user is not currently consuming the media content may be filtered out before passing the raw input data to the model. For example, if the raw input data indicates the head of the user was not pointed at the input device or media content display, if the measured time indicates that the media content presentation has concluded, or if there are other undesired aspects of the raw data, those can avoid being passed to the model and therefore improve the accuracy of the generated predictions about the user's experience in consuming the media content. An independent linear regressor is trained on each one dimensional signal using the original four point rating. The regressor outputs are binarized via thresholding for which optimal threshold value is learnt from the data. This binarization step acts as strong non-linear denoising. At the next stage, the thresholded values are simply summed up and binarized again. To keep modelling simple, each input is assigned the same weight, but further optimization would yield signal specific weights. All of the model parameters are learned on the training set. The logistic regression input is the output of the ensemble and its target variable is the binarized rating. This final step ensures a calibrated probabilistic output denoted by p.

The ensemble model is thus composed of standard linear regressors, nonlinear terms (binarization), summation and final thresholding. For receiver operating characteristics curve (ROC AUC) calculation the output of the summation is used instead. The processing is the same for all signals and incorporates the following steps. The input x to the linear regressor at the first stage is one of the selected features described above. The target variable is the original four point rating as described above. The weight and bias parameters (w, β) are trained on the training set in a stage-wise manner (instead of applying joint optimization of all parameters simultaneously in the two stages). As next step the output y of the regressor is binarized. This step enables noise suppression by learning a threshold α. After this stage the outputs ŷ of the individual signal modelling paths are combined by simple summation and thresholding.

In the McDuff study the classifier of choice was Support Vector Machine with Radial Basis Function kernel (RBF-SVM). After training the decision boundary is represented by "support vectors" which are the most difficult cases from both classes to be distinguished. A disadvantage of this method is that the required sample size depends on the representation. High ratio of support vectors over sample size indicates that the requirement is not met and the resulting model will have large generalization error on unseen data. In a precursor to the McDuff study, time series were segmented into 10 parts and summary statistics (max, mean, min) were calculated for each segment. The resulting high dimensional representation was then input to the SVM classifier. In the McDuff study itself, segmentation was dropped and the same summary statistics were calculated over the entire time series of the facial expression estimates (presence of AUs, intensity of given discrete expression, etc.). The resulting representation still had 16 dimensions.

Results

Test results are first reported across all commercials, countries and product categories. Then results are reported for more fine-grained comparisons. These are models that: (1) include only a single variant for related commercials, which eliminates any bias due to correlation among the sample commercials but may be influenced by the reduced number of commercials; and (2) differentiate between product categories and countries.

The current findings were then compared with the results of the McDuff study. This comparison demonstrates that dynamic features according to the systems and methods disclosed herein enable increased accuracy and greater consistency across product categories. For all comparisons, we report both accuracy and area under the receiver operating characteristics curve (ROC AUC). Accuracy is the sum of true positives and true negatives divided by all cases. It is intuitively appealing but difficult to interpret when distributions are imbalanced. In such cases, accuracy becomes a biased estimator of agreement between a classifier and ground truth. ROC AUC quantifies the continuous relation between true and false positives.

If higher rank is assigned to the "positive class" (i.e., commercials that scored higher) then the area under the curve gives the probability that a randomly selected positive instance will be ranked higher than a randomly selected negative one. By definition ROC AUC is 0.5 for a random classifier. ROC AUC is unaffected by imbalance between positive and negative cases, although it may mask differences between classifiers in precision and recall). In our data, class imbalance is mild when comparing across product categories and countries (56%), but often is larger when comparing between categories or countries. Thus, accuracy should be interpreted with caution.

To ensure that the trained models do not overfit, in which case models learn to represent noise components in the training data and become unpredictable in new data, different validation schemes were applied to assess generalization capacity of the trained models. Appropriate for the sample size, K-fold cross-validation (Kx-CV) was used in which samples are iteratively split into K disjoint training and test sets and the final performance metrics are averaged over the tests sets. In the tests K=10 folds was used and the procedure was repeated n=10 times. From the repeated measurements confidence intervals were calculated at 95% confidence using t-statistics, which is better suited for small sample size. To help interpret the results, a baseline was reported which is a random model with a prior of the class probability of the training data.

As ads can be grouped along model independent factors like regions and product category, particular cross validations can be run where splits are defined by these factors. We will refer to these validation schemes as Leave One Label Out (LOLO) validation. These experiments test robustness of model performance against variations in those factors.

To enable comparison with the McDuff study a Leave One Out (LOO) was conducted where test folds contain only one sample. However, for some metrics (ROC AUC in particular) LOO displays strange behavior when sample sizes become small.

Results are also reported for the case when only one ad variation is selected. While this data filtering may reduce potential ambiguity in the class membership, it reduces sample size, making training more difficult. To avoid any bias induced by arbitrary selections nested cross-validation was ran for ad selection in each group of the ad variations. The reported metrics are then averages over random ad selections.

Test Results on All Samples

The proposed model was trained and cross-validated on all commercials (N=147) without respect to product category or country. ROC AUC was 0.747 with a narrow confidence interval of only ±0.025 which indicated high reliability. See Table 2.

TABLE 2

Cross-Validation test (emotion and head pose signals + ensemble model) using all sample points. Performance is expressed in Accuracy and ROC AUC. Where appropriate we report confidence interval at 95% confidence as well.

| repeated 10-fold CV | Accuracy | ROC AUC |
| --- | --- | --- |
| Our model | 71.4 ± 2.2% | 0.747 ± 0.025 |
| Random baseline | 52.3 ± 2.7% | 0.50 |

Robustness Against Ad Variants

When the dynamic model was trained and cross-validated without inclusion of variants (N=116), ROC AUC remained about the same and confidence interval decreased from ±0.025 to ±0.01. In this setting only one variation was kept out of several options in each ad group. To counter bias due to random selections the random ad selection was repeated 10 times and ran 10-fold CV for each random selection. See Table 3.

TABLE 3

Cross-Validation test of the proposed approach (mix of emotions and dynamic head pose signals + ensemble model) using random selections of unique variations of the ads. (Sample size N = 116). Performance is expressed in Accuracy and ROC AUC. Where appropriate confidence interval was reported at 95% confidence as well.

| 10-fold CV | Accuracy | ROC AUC |
| --- | --- | --- |
| Our model | 72.8 ± 0.8% | 0.745 ± 0.01 |
| Random baseline | 53.8 ± 1.0% | 0.50 |

Results obtained are quite similar to those obtained on all data points. It indicates that in contrast to the original hypothesis about ambiguity in the labels, the ad variations indeed elicit different behavioral responses. In turn, variations can be considered as independent sample.

Robustness Against Category and Country Differences

To test how well the model generalizes the training testing procedure was modified as follows. Training was done on all but one product category, testing on the one omitted, and then iteratively repeating training and testing for each category. This is referred to as leave-one-label-out cross-validation (LOLO validation). Similarly, the same iterative LOLO can be performed for country.

ROC AUC was fairly consistent over all but one category (the only exception was the very small Food category with very high ROC AUC value). The consistency of findings among different product categories is quite remarkable.

ROC AUC was also fairly similar in all but one country (the only exception with low ROC AUC value was Russia which does not have a single top performing ad with rating 4).

TABLE 4

Generalization performance of the proposed sales prediction model on different product categories. The validation scheme is LOLO so train fold does not contain samples from the category the test ads belong to. #low and #high denote the number of samples in the low and high performing classes, respectively.

| Category | Accuracy | ROC AUC | #low | #high |
|---|---|---|---|---|
| Confections | 60.0% | 0.702 | 23 | 22 |
| Food | 91.7% | 0.975 | 10 | 2 |
| Petcare | 71.9% | 0.720 | 36 | 21 |
| Chewing Gum | 66.7% | 0.700 | 13 | 20 |
| Average | 72.6% | 0.774 | | |

TABLE 5

Generalization performance of the proposed sales prediction model on ads from different regions. The validation scheme is LOLO so train fold does not contain samples from the region the test ads belong to. #low and #high denote the number of samples in the low and high performing classes, respectively.

| Region | Accuracy | ROC AUC | #low | #high |
|---|---|---|---|---|
| Australia | 74.1% | 0.833 | 18 | 9 |
| France | 73.3% | 0.786 | 8 | 7 |
| Germany | 76.2% | 0.824 | 9 | 12 |
| Russia | 59.1% | 0.386 | 15 | 7 |
| UK | 78.8% | 0.806 | 19 | 14 |
| USA | 69.0% | 0.733 | 13 | 16 |
| Average | 71.7% | 0.728 | | |

Comparison of Approaches Disclosed Herein Versus the Convention

The approach proposed in the McDuff study and the model presented herein both involve webcam assessments of subjects' responses to the same product categories in four of the same countries. In both cases, sales lift data was obtained from the same source. In both cases results were quantified at ROC AUC, but in the McDuff study only LOO validation was reported, while the present example reported repeated 10-fold cross-validation. The two major differences between the approaches are the features that represent data and the applied classification model. The two approaches differed in other respects, as well, unrelated to types of features, products, or countries. These differences, such as the number of commercials (fewer for the example model) and the viewing period (more recent and over fewer years for the example model), and other procedural aspects are unrelated to type of features.

Statistical Analysis

With the above caveat in mind, the influence of the features on the classification performance is reported. To help the comparison with the past reports on the static approach, the same RBF-SVM was trained on the set of features proposed in this study. Table 6 reports results for McDuff's signals as well as for the example signal results as described above. The features are not exact replicas of the ones used in the McDuff study, but are similar (for example, the "valence" metric, which is actually derived from the activation of other classifiers like smile, was replaced by exemplary disgust classifier outputs, eye brow raise was replaced by our own surprise classifier).

Also included are separate results for representations using only head pose information and representation using only facial expression information (based on smile, surprise and disgust dynamics). For the proposed example model, performance was better when head and face dynamics were combined rather than used exclusively. This suggests that the packaging of nonverbal behavior, head pose and motion, independently contributes to predicting sales lift. For both LOO and 10-fold cross-validation, the combined representation of the example model produced much higher performance, while using McDuff's conventional representation yielded about random chance performance. This finding emphasizes the importance of head pose information and session level analysis. The magnitude of the difference between the representations suggests that procedural differences (such as number of commercials viewed) play at most a minor role. The number of support vectors (#SV) kept after training as an indicator of generalization problems is also reported. For 147 samples in 10-fold cross-validation scheme, the size of a training fold is about 132. An SVM model cannot generalize well if #SV is as large as the entire training fold. The results confirmed the assumption that low performance as reported in the McDuff study is due to the fact that classification of high dimensional representations by non-linear SVM requires more data. This additional data requirement is not necessary to perform the methods disclosed herein.

The ensemble model not only performed better on the combined signal than the SVM model of McDuff (0.747±0.025 versus 0.701±0.021), but it is markedly simpler (as indicated by the number of parameters in the two trained models). In turn, it is expected to result in smaller generalization error on unseen data. Another advantage is that improvement by adding other behavioral signals increases model complexity in a well-controlled way thus preserving generalization of the improved model.

TABLE 6

Impact of the different representations on the classification performance. The classifier is the same SVM with non-linear radial basis function kernel. This comparison also shows the complementary nature of head pose and facial expression information.

| Validation | Signal | ROC AUC | #SV |
|---|---|---|---|
| LOO | Head pose | 0.685 | 127 |
| | Facial expressions | 0.30. | 107 |
| | Combined signals | 0.732 | 122 |
| | McDuff's signals | 0.503 | 130 |
| 10-fold CV | Head pose | 0.610 ± 0.021 | 90 |
| | Facial expressions | 0.677 ± 0.023 | 96 |
| | Combined signals | 0.701 ± 0.021 | 109 |
| | McDuff's signals | 0.580 ± 0.023 | 118 |

One of the biggest challenges in today's market research is the exponential growth of the number of media contents to be analyzed since traditional survey-based methods do not scale well. In addition, those methods fail to capture the important emotional aspects of the interaction between content and consumers.

The present systems and methods disclosed herein created a feasible data acquisition system that allows for large scale behavioral data collection and analysis for practical market research. Such systems and methods also trained a classification model that learned to distinguish ads with high and low sales performance. Although the size and structure of the training data are limited it showed that the learned model generalizes well over some factors not used in the modelling. These promising results may pave the way for a new generation of automated, cost-efficient, behavioral cue driven market research tools for analysis.

To further improve methodology, several limitations need to be addressed. Behavioral analysis is based on average responses assuming that individual differences are just random perturbations. However, it is more likely these individual differences carry relevant information about the differences between the ads. Another limitation is that our model does not allow for more complex interactions between observations. Once more samples are available our method can be extended to include more features and it can also capture linear or non-linear interactions between features (generalized stepwise linear regression models can systematically check pairwise or higher order interactions between features). Finally, hybrid models that test conscious recollection and immediate behavioral-emotional responses must be developed to fully understand the impact of ads on consumer behavior.

FIGS. 1 through 5 are conceptual illustrations allowing for an explanation of the present invention. Those of skill in the art should understand that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and implemented by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computer-implemented method of predicting performance data for a piece of media content that is consumable by a plurality of users, each of the plurality of users being at a respective client device, the method comprising:
   collecting, at each of a plurality of the respective client devices, raw input data indicative of a user response to the piece of media content during consumption of the piece of media content;
   processing the collected raw input data to:
      extract a time series of descriptor data points for each user response,
      obtain a time series of emotional state data points for each user response;
      determine a predictive parameter from the time series of descriptor data points or the time series of emotional state data points for each of the plurality of users, by:
      calculating a temporal difference between the extracted time series of the descriptor data points or the time series of emotional state data points;
      normalizing the temporal difference to produce a normalized temporal difference by subtracting an average difference from the temporal difference;

segmenting the time series into a plurality of time bins having a predetermined duration;
calculating a maximum of the normalized differences;
weighting and summing the values of each of the plurality of time bins; and
normalizing by the length of the piece of media content; and
obtain a plurality of group predictive parameters based on the predictive parameters determined for the plurality of users by generating a descriptive statistic indicative of the predictive parameter across the plurality of users,
inputting the plurality of group predictive parameters to a classification model;
predicting performance data for the piece of media content by operating the classification model to map the obtained plurality of group predictive parameters of the time series of descriptor data points or the time series of emotional state data points; and
outputting the predicted performance data for the piece of media content obtained from the classification model,
wherein the predictive parameter is a quantitative indicator of relative change in the response of the user to the piece of media content, and wherein each group predictive parameter is a descriptive statistic indicative of the respective predictive parameter across the plurality of users.

2. A computer-implemented method according to claim 1, wherein the step of processing the collected raw input data further comprises:
applying a linear regression to the predictive parameter to output a linear regression output;
binarizing the linear regression output to produce a binarized output; and
applying a logistic regression to the binarized output to output the predicted performance data.

3. A computer-implemented method according to claim 1, further comprising:
calculating a temporal difference $dx_i^j$ between the extracted time series of the descriptor data points or the time series of emotional state data points, wherein $$dx_i^j = \frac{dx^j}{dt_i},$$

and wherein $x^j(t)$ is a time series of a quantitative parameter x of the extracted descriptor data point or the extracted emotional state data for a user j;
normalizing the temporal difference to produce a normalized temporal difference $dx_i^{j*}$ by subtracting an average difference $\langle dx^j \rangle$ from the temporal difference $(dx_i^{j*} = dx_i^j - \langle dx^j \rangle)$, wherein $$\langle dx^j \rangle = \frac{\sum_{i=0}^{T} dx_i^j}{T},$$

and T is a duration of the time series;
segmenting the time series into a plurality of time bins having a predetermined duration;
calculating a maximum of the normalized differences according to $mx_k^j = \max_{i \in k}(dx_i^{j*})$, wherein the notation $i \in k$ means that the ith value falls in bin k;
weighting and summing the values of each of the plurality of time bins according to $$Dx^j = \sum_{k=1}^{n} w_k * mx_k^j,$$

wherein n is the number of bins so there is no more frame or segment index of the variable;
normalizing $Dx^j$ by the length of the piece of media content;
generating a descriptive statistic indicative of the predictive parameter across the plurality of users.

4. A computer-implemented method according to claim 1, wherein the client device is communicable with a server device over a network, and wherein the processing of the collected raw input data occurs at the server device.

5. A computer-implemented method according to claim 1, wherein the raw input data includes any of user behavioral data, user physiological data or metadata relating to the piece of media content.

6. A computer-implemented method according to claim 1, wherein each emotional state data point is determined based on one or more descriptor data points.

7. A computer-implemented method according to claim 6, wherein each descriptor data point includes a quantitative parameter that is indicative of a feature extracted from the raw input data.

8. A computer-implemented method according to claim 7, wherein the predictive parameter is a function of relative change of the quantitative parameter between adjacent emotional state data points in the time series of emotional state data points.

9. A computer-implemented method according to claim 1, wherein each emotional state data point includes a quantitative parameter that is indicative of user emotional state.

10. A computer-implemented method according to claim 9, wherein the predictive parameter is a function of relative change of the quantitative parameter between adjacent emotional state data points in the time series of emotional state data points.

11. A computer-implemented method according to claim 1, wherein processing the collected data includes inputting the obtained plurality of group predictive parameters into the classification model that maps between the obtained group predictive parameters and the performance data.

12. A computer-implemented method according to claim 1, wherein the predicted performance data output is generated using a result output from the classification model.

13. A computer-implemented method according to claim 1, wherein the raw input data comprises image data captured at the client device.

14. A computer-implemented method according to claim 13, wherein the image data includes a plurality of image frames showing facial images of a user.

15. A computer-implemented method according to claim 6, wherein each descriptor data point is a facial feature descriptor data point that is a multi-dimensional data point, each component of the multi-dimensional data point being indicative of a respective facial landmark.

16. A computer-implemented method according claim 15, wherein each facial feature descriptor data point is associated with a respective frame.

17. A computer-implemented method according to claim 1, wherein the piece of media content is any of a live video stream, a video commercial, an audio commercial, a movie trailer, a movie, a web advertisement, an animated game, or an image.

18. A computer-implemented method according to claim 1, wherein the performance data is sales lift data.

19. A computer-implemented method of predicting performance data for a piece of media content that is consumable by a plurality of users, each of the plurality of users being at a respective client device, the method comprising:

collecting, at each of a plurality of the respective client devices, raw input data indicative of a user response to the piece of media content during consumption of the piece of media content;

processing the collected raw input data to:
extract a time series of descriptor data points for each user response;
obtain a time series of emotional state data points for each user response;
determine a predictive parameter from the time series of descriptor data points or the time series of emotional state data points for each of the plurality of users by:
calculating a temporal difference between the extracted time series of the descriptor data points or the time series of emotional state data points;
normalizing the temporal difference to produce a normalized temporal difference by subtracting an average difference from the temporal difference;
segmenting the time series into a plurality of time bins having a predetermined duration;
calculating a maximum of the normalized differences;
weighting and summing the values of each of the plurality of time bins; and
normalizing by the length of the piece of media content; and obtain a plurality of group predictive parameters based on the predictive parameters determined for the plurality of users by generating a descriptive statistic indicative of the predictive parameter across the plurality of users;

inputting the plurality of group predictive parameters to a classification model which operates to map the obtained plurality of group predictive parameters of the time series of descriptor data points or the time series of emotional state data points to predict performance data for the piece of media content;

predicting performance data by operating the classification model; and outputting the predicted performance data for the piece of media content obtained from the classification model, wherein the predictive parameter is a normalized quantitative indicator of relative change in the response of the user to the piece of media content, and wherein each group predictive parameter is a descriptive statistic indicative of the respective predictive parameter across the plurality of users.

* * * * *